UNITED STATES PATENT OFFICE.

JAMES C. TITZEL, OF ALLEGHENY, PENNSYLVANIA, ASSIGNOR OF TWO-THIRDS TO JOHN LYNCH AND JOHN A. TITZEL, OF SAME PLACE.

PROCESS OF TREATING VULCANIZED INDIA-RUBBER.

SPECIFICATION forming part of Letters Patent No. 265,184, dated September 26, 1882.

Application filed July 15, 1882. (No specimens.)

*To all whom it may concern:*

Be it known that I, JAMES C. TITZEL, of Allegheny, in the county of Allegheny and State of Pennsylvania, have invented a new and Improved Process of Treating Vulcanized India-Rubber, of which the following is a full, clear, and exact description.

The object of my invention is the production from vulcanized india-rubber (rubber scrap or waste) of a practically-pure soluble rubber in paste form, adapted to be mixed with paraffine for waterproofing and saturating purposes, or with the oxide of zinc, lead, or iron to give the same a metallic base, or thinned with linseed-oil or Japan driers, and mixed with pigments of the desired color to be used as a paint.

In carrying my process into effect I charge into a small Florence flask or still two ounces of vulcanized india-rubber waste, four drams raw linseed-oil, and two ounces spirits of turpentine. The flask or still is then connected by means of a perpendicular pipe with a globe condenser in such manner that when the turpentine rises it will be condensed and run back into the still or flask. A moderate fire-heat is now applied to the flask or still and continued until the liquid begins to boil and the rubber goes into solution, care being taken not to raise the heat above 350° Fahrenheit. During this heating the turpentine will constantly flow back from the condenser into the still and keep up the supply. When the rubber is all dissolved the product will be about four liquid drams of a mixture of india-rubber, turpentine, and raw linseed-oil in the still or flask. The perpendicular tube and globe condenser are now to be detached from the still or flask and the latter connected with a worm, and the turpentine exhausted from the still by the application of a gentle fire-heat. When this has been completed, and while the still is yet hot, the contents thereof are to be poured into an acid and alkali proof vessel and allowed to cool down to about 150° Fahrenheit. When at this temperature sulphuric acid (commercial) is to be added in small quantities with constant stirring, allowing the mass to cool by repose as the heat is raised by the action of the acid, the adding to continue until the pigment or filling used in the process of vulcanizing the rubber is all dissolved, which will be known when the acid ceases to have any effect or action upon the mass. The mass is now left at rest for about two hours. Then a sufficient quantity of pure water to cover the mass is poured into the vessel and the whole heated to the boiling-point. The mass is now worked—stirred and pressed—until the acid salts produced by the action of the acid upon the filling or pigment in the rubber is all washed out. This having been done, four ounces of caustic-potash solution is added, and the mixture placed over a fire and boiled a few minutes until the linseed-oil yet contained in the mixture saponifies and the whole goes into a creamy mixture. This creamy mixture is now to be poured into about two gallons of pure water heated to about 150° Fahrenheit, and the whole thoroughly agitated, and then left until the rubber precipitates to the bottom of the vessel. The solution is now to be drawn off and the rubber gathered from the bottom of the vessel. The rubber is then to be worked in pure water until thoroughly washed. After washing the water is to be worked and evaporated out of the mass by a gentle heat, thus producing a pure india-rubber in paste form. This pure rubber is adapted to be added to paraffine for waterproofing and saturating purposes, and to be mixed with the oxide of zinc, lead, or iron to give it a metallic base; or it may be thinned with linseed-oil or Japan driers and mixed with pigments of any desired colors to be used as a paint.

This process is applicable to any vulcanized rubber; but I prefer to use old rubber, since in so doing I utilize what is now a waste.

In mixing the rubber with paraffine I take of the rubber one part and of commercial paraffine-wax one part, and add thereto two parts, by weight, of linseed-oil and stir the mass until a thorough mixture is obtained; or the mixture may be made by adding the paraffine to the rubber, linseed-oil, and turpentine.

Having thus fully described my invention, I claim as new and desire to secure by Letters Patent—

The process herein described of treating vulcanized india-rubber for the production of a pure rubber, consisting in dissolving the rubber in turpentine and linseed-oil, then adding sulphuric acid and washing, then adding caustic potash, then precipitating from the soapy mass the pure rubber, substantially as described.

JAMES C. TITZEL.

Witnesses:
JOHN B. LYNCH,
CHARLES R. WEITERSHAUSEN.